United States Patent
Kilroy

(10) Patent No.: US 8,815,322 B2
(45) Date of Patent: Aug. 26, 2014

(54) LIQUEFACTION OF CHEESE

(75) Inventor: Stanley Alan Robert Kilroy, Donvale (AU)

(73) Assignee: Food Mechanique Australia Pty Limited, Melbourne, Victoria (AU)

( * ) Notice: Subject to any disclaimer, the term of this patent is extended or adjusted under 35 U.S.C. 154(b) by 392 days.

(21) Appl. No.: 12/595,478

(22) PCT Filed: Apr. 10, 2008

(86) PCT No.: PCT/AU2008/000512
§ 371 (c)(1),
(2), (4) Date: Nov. 19, 2009

(87) PCT Pub. No.: WO2008/122094
PCT Pub. Date: Oct. 16, 2008

(65) Prior Publication Data
US 2010/0092647 A1    Apr. 15, 2010

(30) Foreign Application Priority Data
Apr. 10, 2007  (AU) ................... 2007901878

(51) Int. Cl.
*A23C 19/00*  (2006.01)
*A23C 19/086*  (2006.01)
*A23C 19/09*  (2006.01)
*A23C 19/08*  (2006.01)

(52) U.S. Cl.
CPC ............... *A23C 19/08* (2013.01); *A23C 19/086* (2013.01); *A23C 19/0904* (2013.01)
USPC ............................ 426/582; 426/519; 426/520

(58) Field of Classification Search
USPC ......... 426/474, 475, 476, 506, 509, 510, 511, 426/519, 520, 580, 582
See application file for complete search history.

(56) References Cited

U.S. PATENT DOCUMENTS

| | | | |
|---|---|---|---|
| 4,329,374 | A | 5/1982 | Invernizzi et al. |
| 5,240,724 | A | 8/1993 | Otto et al. |
| 6,368,652 | B1 | 4/2002 | Heertje et al. |
| 2006/0286253 | A1 * | 12/2006 | Lov et al. ...................... 426/582 |

FOREIGN PATENT DOCUMENTS

| | | |
|---|---|---|
| EP | 0 499 041 | 8/1992 |
| GB | 2 237 178 | 5/1991 |
| JP | 59 009138 | 2/1984 |
| JP | 63-294742 | 12/1988 |
| JP | 02-092239 | 4/1990 |
| JP | 04-011836 | 1/1992 |

OTHER PUBLICATIONS

International Search Report; PCT/AU2008/000512; A. Thomas; May 16, 2008.
NZ Examination Report; Appln. 580517; Oct. 15, 2010.
NZ Examination Report; Appln. No. 580517; Jun. 23, 2011.
NZ Examination Report; Appln. No. 580517; Oct. 28, 2011.
NZ Examination report; Appln. No. 580517; Jan. 12, 2012.
Kapoor et al; Process Cheese: Scientific and Technological Aspects—A Review; Comprehensive Reviews in Food and Science and Food Safety; vol. 7, 2008; pp. 194-195.
Supplementary European Search Report; EP 08 73 3340; Feb. 9, 2012; 6 pp.
Examination Report; AU 580517; Mar. 27, 2012; 2 pp.
Examination Report and Notice of Acceptance of Complete Specification; AU 580517; May 29, 2012; 5 pp.
Examination Report; AU 2008235266; Jun. 14, 2012; 3 pp.

* cited by examiner

*Primary Examiner* — Leslie Wong
(74) *Attorney, Agent, or Firm* — Fish & Richardson P.C.

(57) ABSTRACT

The invention relates to the processing of cheese, and in particular to a method of liquefying cheese to produce a low viscosity product with enhanced handling properties. The invention also relates to various cheese products prepared from such liquefied cheese, those products retaining varietal characteristics of the cheese subjected to liquefaction, as well as exhibiting useful storage longevity.

21 Claims, No Drawings

LIQUEFACTION OF CHEESE

This application is a 371 of PCT/AU08/00512, filed Apr. 10, 2008.

FIELD OF THE INVENTION

The invention relates to the processing of cheese, and in particular to a method of liquefying cheese to produce a low viscosity product with enhanced handling properties.

The invention also relates to various cheese products prepared from such liquefied cheese, those products retaining varietal characteristics of the cheese subjected to liquefaction, as well as exhibiting useful storage longevity.

BACKGROUND OF THE INVENTION

In the early 20$^{th}$ century, J.L. Kraft recognised that there was a disparity between the most cost-effective way of producing Cheddar (in large wheels and such) and the most cost-effective way of selling that cheese to a consumer (in smaller blocks). Traditionally it was a matter of slicing a portion of cheese off from the larger wheel. The practical disadvantages of this process (which accelerated spoilage) were felt hardest in applications such as the preparation of ration packs for the Armed Forces.

It has since been shown that there are methods available that enable cheese to be processed into such shapes as slices. The methods of processing cheese usually include the incorporation of artificial additives into the cheese mass. There is little doubt that the modern consumer shuns the incorporation of materials of an unnatural nature into their consumed foodstuffs. This modern conception appears to be at odds with the obvious health benefits associated with the consumption of cheese and the convenience that processed cheese products provide. Modern health-conscious consumers demand a higher level of quality than ever, and seek to consume foods that are free from additives that are deemed to be 'artificial'. Furthermore, the efficiency of modern high throughput processing and packaging machinery is facilitated by products that remain substantially fluid for longer periods to be pumped, poured and so on. There is clearly a need for developing a cheese product free of artificial additives, and a process for manufacture of same, that possesses the varietal flavour of its parent product, has enhanced handling properties and resists spoilage.

SUMMARY OF THE INVENTION

The present invention is predicated, in part, on the discovery that the incorporation of one or more emulsifying salts (such as citrate, tartrate and phosph(on)ate salts) is not necessary to process cheese to a desired level of sterilisation, viscosity and taste if careful attention is given to the conditions under which the cheese is heated. Given the judicious choice of heating regime and incorporation of moisture, the methods of the present invention are capable of forming a liquefied hot cheese mass. Thus, in several aspects, the invention provides methods of liquefying cheese, and the products of said methods.

The liquefied hot cheese mass has a relatively much lower viscosity, and remains so for longer periods at diminished temperature, than previously discovered or envisaged, and possesses enhanced handling properties (such as pumpability). The hot cheese mass may be subjected to further processing steps including: cooling to near room temperature to produce a substantially liquid cheese product (such as a spreadable gel); separately, sequentially or simultaneously cooling the cheese mass to near room temperature and evaporating a substantial proportion of water therefrom to afford a solid cheese product (such as a baked cheese biscuit); and finely dividing the mass with subsequent evaporation of a substantial proportion of water therefrom to afford a solid cheese product (such as a cheese powder).

Accordingly, in one aspect the invention provides a method for liquefying cheese comprising raising the temperature of the cheese in the presence of water to greater than 82° C. under conditions which allow the water to be incorporated into the cheese without syneresis to provide liquefied cheese in a substantially homogenous state, without the use of additional emulsifying agents.

As used herein, the term 'liquefying' refers to the transformation of a 'substantially solid' material into a 'substantially liquid' material. In particular, a 'substantially solid' material exhibits the properties of a solid on a macroscopic level. On a macroscopic level, a solid does not readily flow. It is understood that in composite materials (such as cheese) there may be components that have different melting points and heat capacities. In this respect, cheese is made up predominantly of water, fat and protein (predominantly casein). It is known that, at room temperature, certain fats present within a cheese mass may be substantially more liquid in character than the protein therein. Nonetheless, the term 'substantially solid' is understood to encompass such composite materials wherein certain components may be considered in isolation to be liquid but, as a whole, the composite material displays the properties of a solid. Likewise, a 'substantially liquid' material exhibits the properties of a liquid on a macroscopic level. On a macroscopic level, a liquid readily flows. The term 'substantially liquid' may be construed to encompass those composite materials wherein certain components may be considered in isolation to be solid or gaseous but, as a whole, the composite material displays the properties of a liquid. It is understood that the viscosity of a material typically varies as a function of temperature, materials typically becoming less viscous as their temperature increases. It is also known that a change in density of a material often makes a significant contribution to the decrease in viscosity observed in the material as it is heated. As used herein, an example of a 'liquefying' process is a macroscopic phase transition of a substantially solid material to a substantially liquid material, observable through a decrease in viscosity under conditions of constant volume or constant pressure.

As used herein, the term 'syneresis' refers to the draining of less viscous components of the cheese mass from the more viscous components therein. Typically 'syneresis' refers to the separation within a cheese mass of a substantial proportion of the water and/or fat from the protein. Syneresis is often observed when the water or fats pool together.

As used herein, the term 'homogenous' refers to a property of a material wherein the components therein are uniformly distributed throughout. Examples of substantially homogenous materials are homogenised milk and blocks of Cheddar cheese.

As used herein, the term 'additional' refers to any quantity of one or more 'emulsifying agents' not naturally found in the particular cheese variety that is the subject of the method.

In another aspect, the invention provides a method for liquefying cheese comprising raising the temperature of the cheese and water under conditions which allow the water to be incorporated into the cheese without syneresis to provide liquefied cheese in a substantially homogenous state and having a viscosity at the raised temperature of less than 1500 mPa·s, without the use of additional emulsifying agents.

DETAILED DESCRIPTION OF PREFERRED EMBODIMENTS OF THE INVENTION

The methods of the present invention are suitable for application to most cheese varieties. Cheeses are often distinguished through variations in the origin of the milk, the process of manufacture and/or the conditions of maturation. Especially suited to the present invention are cheeses of the acid or rennet varieties. Preferably, cheese varieties suitable for use in the present invention include Cottage, Cream, Colby, Gouda as well as both young and mature Cheddar varieties. Through the optional application of specific procedures prior to heating, the methods of the present invention may be applied to many other varieties of cheese.

It is understood that different cheeses often contain different amounts of water. Whilst a large number of cheeses are relatively dry to touch (for example mature Cheddar cheese), other cheeses contain a relatively large amount of water, a portion of which may not be incorporated within the cheese solids (for example Cottage cheese). The source of this unincorporated portion of water may be residual whey. In this respect, the methods of the present invention provide for the incorporation of water into cheese that has otherwise not been previously incorporated into the cheese prior to performing the methods. For example, Cottage cheese of itself may be subjected to the methods of the invention without the addition of water from another source. The resultant product is typically a stable, spreadable cheese product.

The methods of the present invention are not limited to their application to only one cheese variety at a time. It may, in fact, be desirable to use cheese mixtures or blends in certain circumstances. The blending of cheese mixtures or varieties may preferably occur prior to subjecting the mixture to the methods of the present invention, but it may also occur during any one of the methods of the present invention and it may occur after any one of the methods of the present invention. In one example, Cheddar cheese may be combined with a more mature product of the same variety. In another example Cheddar cheese may be combined with Colby cheese. The blending of cheese mixtures or varieties may be accomplished by maceration before the mixture is subjected to any one of the methods of the present invention. In another example, the source of water used in the methods of the invention may be a cheese, preferably a watery cheese with a high residual whey content. In such an example, the cheese which is the source of water and another cheese which is to be liquefied are contacted and the mixture is heated according to a method of the invention. In another example, two hot liquid cheese masses derived from different varieties may be combined after subjecting each cheese mass to a different heating regime. In a still further example of the versatility of the present invention, blends of two or more cheese masses obtained from the application of two of more different methods of the present invention may be blended together and subjected to any further one or more steps.

Preferably, the process of raising the temperature of the cheese in the presence of water also involves mixing the cheese and water. More preferably, the two entities are thoroughly mixed. Mixing may be enhanced through the fine division of the cheese using a milling, macerating or grinding process. In one embodiment, the cheese and water are brought into contact in a vessel with simultaneous thorough mixing using an impeller. Preferably the impeller can rotate at a variable speed, wherein the speed is adjusted so as to control the amount of heat generated due to the friction of the impeller blade with the cheese mass. Preferably the amount of heat generated due to friction is minimised during the early stages of mixing. Preferably the cheese and water are mixed under conditions such that the water is incorporated completely into the cheese mass. The incorporation of the water into the cheese mass prior to heating may or may not be stable. In another embodiment of the methods of the present invention, water in the form of steam may be introduced during the process of raising the temperature. The steam may, or may not, comprise the entirety of the water, in the presence of which the cheese is heated. It is understood that applying steam directly to cheese at room temperature often leads to syneresis. Accordingly, when steam is applied directly to the cheese it is preferable that the cheese has been conditioned to accept the water and heat from the steam without syneresis. In some embodiments, this result may be achieved by carefully heating the cheese to 60° C. prior to the steam being injected. Without wishing to be bound by theory it is believed that heating cheese under conditions that promote syneresis leads to the irreversible shrinkage of the casein portion of the cheese and expulsion of water therefrom. On the other hand, the methods of the present invention promotes expansion of the casein portion of the cheese and inclusion of water therein. It is believed that the inclusion of water facilitates the production of a fine emulsion of the components of the cheese which is retained upon cooling.

As used herein, the process of 'contacting' involves the bringing into close physical proximity of two or more discrete entities. In particular, as used herein, the process of 'contacting' involves the bringing into close proximity of two or more discrete entities for a time, and under conditions, sufficient to allow a portion of those two or more discrete entities to interact on a molecular level.

The inclusion of variable quantities of water in the methods of the present invention alters the composition of the final product. The source of water may be pure water, a solution (for example a sugary solution) or may be a watery cheese. An example of a watery cheese is a rennet cheese with a relatively high whey content, such as Cottage cheese. One reason for raising the temperature of the cheese in the presence of water in the present invention is to aid in heat absorption and/or decrease the viscosity of the hot and/or cooled product. Water may also be added during the process in order to break up the cheese mass. The amount of water that may be added may depend on one or more factors. Examples of such factors are the variety of cheese, amount of cheese and the temperature that the cheese mass is to be heated to. Other examples of such factors are the desired final hot viscosity, the desired final cold viscosity where appropriate and/or the nature of any evaporating step or process that may take place. In preferred embodiments, the methods of the present invention use water in a ratio to cheese that is between approximately 10:1 and 1:10 by weight. Preferably, the methods of the present invention use water in a ratio to cheese that is between approximately 1:1 and 1:5 by weight. Even more preferably, the methods of the present invention use water in a ratio to cheese that is between approximately 1:2 and 1:2.5 by weight. The methods of the present invention may also be adapted to incorporate water during the heating regime. Water provided in such a manner may be provided in liquid or gaseous (steam) form. Preferably, if steam is injected into the cheese mass, consideration is taken for the amount of water from that source that will condense into the cheese. Such consideration may result in a reduced amount of water being initially contacted with the cheese prior to heating than would otherwise be contacted were the use of steam not to be employed.

For the methods of the present invention the temperature of the cheese mass is preferably raised such that the differential in temperature between the hottest and coolest parts of the cheese mass is minimised for some portion of the method. Preferably, the differential in temperature is minimised when the temperature of the cheese mass is raised between the initial temperature and a temperature which is between about 50° C. and about 60° C. As used herein, the term 'initial temperature' refers to the temperature of the cheese mass before the step of raising the temperature of the cheese in the presence of water. The initial temperature is preferably less than 30° C. and more preferably less than 25° C. Preferably the temperature differential between the hottest and coolest parts of the cheese mass is no more than 5° C. More preferably, the temperature differential is no more than 3° C. Most preferably, the temperature differential is no more than 2° C. Methods to determine temperature differentials would be well known to a skilled person.

There are various means by which the temperature differential may be reduced. In particular, it is understood that the cheese processor has at their disposal many techniques to ensure the efficient transfer of heat from hotter parts of the cheese mass to cooler parts of the cheese mass. One such technique is the use of a slow increase in temperature that allows conduction of heat away from the heating surface to the cooler parts of the cheese mass at a rate similar to the rate of heating of those portions of the cheese mass that are closest to the heating surface. Preferably, the temperature of the cheese in the presence of water is raised at a rate of less than 5° C. per minute, more preferably at a rate of less than 3° C. per minute and most preferably at a rate of approximately 1.5° C. per minute. The rate of increase in temperature may vary over the course of the method. Another technique to minimise the temperature differential is the use of a slow increase in temperature and halting the heating process at regular intervals for a period of time, thereby allowing conduction of heat away from the heating surface to the cooler parts of the cheese mass at a rate similar to the rate of heating of those portions of the cheese mass that are closest to the heating surface. In certain embodiments, the present invention utilises a heating method wherein the temperature of the heat source is increased slowly with optional periods wherein the increase in temperature of the heating surface is halted. In such embodiments the heating method incorporates periods wherein the increase in temperature of the heating surface is halted, the temperature of the heat source is preferably increased at a rate of less than 5° C. per minute for a period of less than 5 minutes, followed by halting the temperature increase for a period of less than 5 minutes. More preferably the temperature of the heat source is increased at a rate of between 2 and 3° C. (preferably 2° C.) per minute for 2.5 minutes, followed by halting the temperature increase for a period of 1 minute.

Another technique for minimising the difference in temperature between the hottest and coolest parts of the cheese mass, available to the cheese processor, is the sealing of the heating vessel to reduce heat loss through radiation, conduction or convection is another such technique to minimise the temperature differential. The sealing process may be done in such a way as to effect either complete (wherein the pressure within the vessel does change with varying temperature) or partial sealing (wherein the pressure within the vessel does not substantially change with varying temperature). Regardless of the degree of sealing of the vessel, the cheese mass may be subjected to reduced and/or increased pressure. In some embodiments regulation of the pressure allows control of the amount of water that is lost or retained from the cheese mass. In particular, the cheese mass may be subjected to reduced pressure in the form of a partial vacuum. The partial vacuum may be imparted through the action of a mechanical device or water aspirator. The direct injection of steam into the cheese mass represents another technique whereby heat can be efficiently dissipated into its cooler regions.

Completely or partially sealing the vessel may also be useful to prevent loss of cheese and/or water from the vessel whilst the mass is mixed.

In some embodiments of the present invention, the maximum temperature that the cheese is heated to at atmospheric pressure is between about 82° C. and about 100° C. More preferably the maximum temperature that the cheese is heated to at atmospheric pressure is between about 85° C. and about 95° C.

Furthermore, the methods of the present invention may also include additional steps wherein the cheese mass is subjected to one or more heating and/or cooling steps. In particular, the cheese mass may be subjected to a cooling step prior to heating the cheese mass to the highest temperature contemplated by that method. The cheese mass may be subjected to a temperature cycling regime. In particular, the cheese mass may be heated then cooled then reheated. This process may be repeated any number of times until a product of the desired consistency is obtained. In a preferred embodiment, the cheese mass is heated from an initial temperature to a temperature between 45° C. and 60° C., more preferably between 50° C. and 55° C., after which time the cheese mass is cooled to a temperature below 40° C., before the cheese mass is heated to a temperature of above 82° C. In an especially preferred embodiment, the step of raising the temperature of the cheese mass from the initial temperature to above 45° C. is conducted under such conditions as to minimise the temperature differential between the hottest and coolest parts of the cheese. The cycling of the heating regime may be particularly beneficial in the processing of cheese having a structure of greater strength possibly due to the intactness of the protein, such as young Cheddar and Colby varieties.

It is understood that the methods of the present invention are predicated in part on the non-use of 'additional emulsifying agents'. In particular, as hereinbefore described, certain salts (namely the sodium salts of citrate, tartrate and phosph (on)ate) promote the emulsification of the fat and protein within the cheese mass. It is further understood that certain cheeses, of themselves, possess small quantities of salts such as sodium citrate (*J. Dairy Sci.*, 2002, 85, 3155-3163). The use of the expression 'without the use of additional emulsifying agents' is in no means meant to deter the nominal addressee from adding any conventionally known or envisaged additives that do not act as emulsifying agents. In particular, the methods of the present invention are particularly suited to the production of novel, flavoured products by the addition of certain flavouring agents to the cheese mass. Well-known herbs and spices represent examples of such additives. Other examples of such additives include selected meat products and other wholesome ingredients commonly added to natural and processed varieties. Preferably, the products of the methods of the present invention will have retained much of the varietal flavour of the 'unprocessed' ingredient. For example, Cheddar cheese processed according to the present invention will have retained much of the flavour of the unprocessed Cheddar cheese.

Certain varieties of cheese respond differentially to the methods of the present invention. In this respect, it has been found that the use of certain treatment regimes, prior to the application of the method to that cheese, assists in producing an optimal product. Accordingly, as used herein, the term 'pre-treatment' refers to a treatment regime prior to the heating methods substantially as hereinbefore described. Colby, Gouda and young Cheddar varieties often respond well to the heating methods if they are previously cooled to below −10° C., before being allowed to naturally warm to between 10° C. and 25° C. Such varieties often respond especially well to the heating methods if they are previously cooled to approximately −15° C., before being allowed to naturally warm to approximately 18° C. Without wishing to be limited by theory it is believed that the mechanical action of ice crystal formation upon the protein aggregate is a substantial disruptive force and in turn enables the cheese mass to subsequently absorb water more efficiently. Another method of pre-treatment involves a rapid maturation process whereby the cheese to be subjected to the method is stored at greater than 15° C., preferably greater than approximately 20° C., for a period of greater than one week, preferably greater than two weeks. Another method of pre-treatment involves milling the cheese in the presence of an aliquot of water, and allowing the product to absorb moisture for a period time, preferably 5 minutes or longer. This method of pre-treatment is particularly well-suited to hard cheese varieties.

Following liquefaction, the cheese mass may be made the subject of one or more additional steps. In one embodiment, the methods of the present invention may include the step of cooling the free-flowing hot liquid to room temperature either with, or without, mixing. The cooled product typically takes the form of a spreadable gel. A spreadable gel is a semi-liquid product which does not fracture on division but rather may be spread on a surface, such as a paste. The spreadable gel may take the form of a material that flows or may take the form of a more viscous paste. The cooled gels of the present invention are preferably stable at room temperature (or preferably cooler) for greater than one month, more preferably for greater than twelve months. In a preferred embodiment of the present invention, the products of the methods are stable for greater than twelve months at a temperature of less than 10° C., more preferably less than 5° C. Upon standing, the cooled gels of the present invention preferably resist spoilage and are not prone to substantial desiccation. In fact, many of the gels produced upon cooling the products of the methods of the present invention, and following exposure to the atmosphere, develop a mildly desiccated layer on their surface due to evaporation of moisture. Without wishing to be bound by theory, it is this effect that is believed to discourage spoilage which may result from the growth of micro-organisms. When covered, desiccation is very slow and the cheese product remains wholesome for a substantial period of time.

In another embodiment, the methods of the present invention may be elaborated to include the step of subjecting the mass to conditions of such temperature, pressure and humidity as to effect evaporation of a substantial proportion of the water in that liquid mass. Without wishing to be bound by theory it is believed that modifying such conditions provides control over the amount of moisture absorbed by the protein within the cheese mass. The product of such an elaborated method may take the form of a block or slice of substantially solid cheese, or taken to a further reduced level of moisture such as to form a biscuit. In another embodiment, the method of the present invention may be elaborated by incorporating the steps of finely dividing the hot liquid cheese mass before subjecting it to conditions under which evaporation of some of its moisture may occur. As used herein, the term 'finely dividing' refers to methods whereby the mass is divided into particles such as droplets. In particular, the cheese mass may be passed through a nozzle, creating such shear as to separate it into discrete droplets of pre-determined and desired size. The finely divided material may be subjected to conditions of such temperature, pressure and humidity as to effect evaporation of a substantial proportion of the water within that finely divided material. This evaporation may occur while the material is in a suspended state and/or following contact with a surface. In any event, the step of evaporation may, or may not, follow a cooling step, whereby the hot liquid mass is cooled to a pre-determined temperature.

The method is applicable to both batch and continuous manufacturing processes. In particular, the method may be applied through the use of, for example, a cheese 'kettle' comprising a jacketed container wherein the jacket is capable of circulating a heating/cooling liquid. The kettle may also incorporate into its design a port whereby steam or liquid may be injected at a predetermined time. The vessel may also allow for the contents to be readily emptied at any stage. Furthermore, application of a continuous manufacturing process to the present invention is anticipated. A vessel, such as a pipe, through which the flow of a material may be regulated, represents a particularly suitable apparatus through which the methods of the present invention may be performed. In this respect, the methods of the present invention may take place according to the movement of the cheese mass through a pipe into zones of heating and cooling. Vessels consisting of one or more tubes can be constructed to circulate the cheese mass via a pump or pumps at high velocity and with induced turbulent flow, to efficiently distribute the supplied heat, whilst also mixing and homogenizing the mass. Such means can make efficient use of the heat energy by being directed in a countercurrent flow arrangement. Steam injection, when applicable, can take effect in a vessel which has been designed specifically for the purpose. Such a vessel may employ an arrangement of rotating cutters through which the mass is directed and aggressively mixed with steam, via nozzles, during progression through the vessel.

Viscosity is a useful measure of the products and intermediates of the methods of the present invention. In this respect, determination of the viscosity of a cheese mass can be made at a 'hot' temperature and at a 'warm' temperature. It is understood that both the hot and warm viscosities of the cheese mass are, in part, dependant on the varietal nature of that cheese. Young Cheddar varieties, in a similar manner to Colby, Gouda and other varieties having a comparatively strong influence of intact casein, display higher hot and warm viscosities than varieties such as mature Cheddar. Manipulation of the amount of water in the final product provides a means of influencing the viscosity of the cooled cheese. It is known that the viscosity of a material is intrinsically linked, amongst other factors, to the temperature and density of that material and the instrument that is used to determine that value. For the purposes of the experiments of the present invention, the respective viscosities were determined at atmospheric pressure, at the given temperature and determined using an AND sine wave 'vibro' SV-10 viscometer (A&D Mercury Pty. Ltd.) having standard RS-232C connectivity and Win viscometer software. This viscometer measures 'viscosity by detecting the driving electric current necessary to resonate the two sensor plates at constant frequency of 30 Hz and amplitude of less than 1 mm' (A&D Mercury Pty. Ltd.).

The 'hot viscosity' is preferably determined when the temperature of the cheese mass is between 75° C. and 90° C. More preferably the viscosity is determined when the temperature of the cheese mass is between 80° C. and 85° C. The viscosity of the cheese mass may be determined by removing a sample of the cheese from the mass and subjecting it to the apparatus of a viscometer. The hot viscosity (80° C.) of the product formed by subjecting young Cheddar varieties to the methods of the present invention is preferably below 2000 mPa·s, more preferably below 1500 mPa·s and most preferably below 1200 mPa·s. The hot viscosity (83° C.) of the product formed by subjecting mature Cheddar to the methods of the present invention is preferably below 100 mPa·s, more preferably below 50 mPa·s and most preferably below 30 mPa·s. The hot viscosity (77.5° C.) of the product formed by subjecting Colby to the methods of the present invention is preferably below 200 mPa·s, more preferably below 150 mPa·s and most preferably below 100 mPa·s. The viscosity of the cheese mass may also be determined using an 'in-line' viscometer, which may determine the viscosity of the cheese mass without requiring a sample to be removed.

The 'warm viscosity' is preferably determined when the temperature of the cheese mass is between 35° C. and 45° C. More preferably the warm viscosity is determined when the temperature of the cheese mass is between 39° C. and 41° C., most preferably at about 40° C. In general terms, there is approximately one order of magnitude increase in temperature between the hot viscosity and the warm viscosity for a given cheese variety. In this respect, the warm viscosity (40° C.) of the product formed by subjecting young Cheddar varieties to the methods of the present invention is preferably below 13,000 mPa·s and most preferably below 12,000 mPa·s. The warm viscosity (40° C.) of the product formed by subjecting mature Cheddar to the methods of the present invention is preferably below 300 mPa·s and most preferably below 150 mPa·s. The warm viscosity (40° C.) of the product formed by subjecting Colby to the methods of the present invention is preferably below 4,000 mPa·s, more preferably below 3,000 mPa·s and most preferably below 2,500 mPa·s.

The viscosity of each product may be varied by altering the amount of water the cheese is in the presence of before and during the heating method. Manipulation of the viscosity of the product may impact on the economy of reduction of the cheese solids, the application to which the final product is directed and the efficacy of production.

In one example, mature Cheddar cheese heated under conditions which allow the water to be incorporated into the cheese without syneresis to approximately 60° C., followed by steam injection directly into the mass raising the temperature to approximately 95° C., and having a solids content of approximately 45%, may have a hot viscosity of less than 100 mPa·s. The same product may, upon cooling to room temperature, become a gel product having a viscosity of greater than 10,000 mPa·s. In this respect the hot cheese mass is particularly well-suited to be subjected efficiently and economically to a drying process.

In another example, wherein the desired product is a spreadable gel, the properties of flavour and structure may be more important. In this respect, the incorporation of water, and heating regime, may be directed towards producing a product with a hot viscosity of up to 2000 mPa·s.

The invention will now be described with reference to the following examples which illustrate some preferred aspects of the present invention. However, it is to be understood that the particularity of the following description of the invention is not to supersede the generality of the preceding description of the invention.

EXAMPLES

Example 1

Cheddar cheese (1 kg, matured for 6 to 8 months) and water (400 mL), at room temperature, were added to a sealed and jacketed vessel equipped with a cutter and bowl scraper. The cutter was set to rotate at 900 rpm, mixing the cheese and water into a paste within approximately 3 minutes. The cutter speed was increased to 1500 rpm. The temperature of the water circulating through the jacket of the vessel was increased from 23° C., at a rate of approximately 3° C. per minute, pausing every 5° C. for 1 minute, until a temperature of 60° C. was reached. Subsequently, the warm circulating water was replaced with water at a temperature of 20° C., lowering the temperature of the cheese mixture to 20° C. Subsequent heating of the circulating water increased the temperature of the cheese mixture to 40° C., whereupon heating was slowed to incorporate a stepwise heating regime wherein the temperature was held steady for 1 minute every 5° C. rise, until the product had attained a temperature of 95° C.

The viscosity of the cheese upon cooling to 83° C. was 20 mPa·s. The viscosity of the cheese upon further cooling to 40° C. was 147 mPa·s.

Example 2

Cheddar cheese (1 kg, matured for 6 to 8 months) and water (400 mL), at room temperature, were added to a sealed and jacketed vessel equipped with a cutter and bowl scraper. The cutter was set to rotate at 900 rpm, mixing the cheese and water into a paste within approximately 3 minutes. The cutter speed was increased to 1500 rpm. The temperature of the water circulating through the jacket of the vessel was increased from 23° C., at a rate of approximately 3° C. per minute, pausing every 5° C. for 1 minute, until a temperature of 60° C. was reached. Subsequently, the temperature of the circulating water was continuously increased to 93° C. at a rate of approximately 3° C. per minute.

The viscosity of the cheese upon cooling to 83° C. was 20 mPa·s. The viscosity of the cheese upon further cooling to 40° C. was 147 mPa·s. When cooled to 5° C. the viscosity of the product exceeded 5000 mPa·s and remained so when warmed to a temperature of 25° C.

Example 3

Cheddar cheese (1 kg, matured for 6 to 8 months) and water (400 mL), at room temperature, were added to a sealed and jacketed vessel equipped with a cutter and bowl scraper. The cutter was set to rotate at 900 rpm, mixing the cheese and water into a paste within approximately 3 minutes. The cutter speed was increased to 1500 rpm. The temperature of the water circulating through the jacket of the vessel was increased from 23° C., at a rate of approximately 3° C. per minute, pausing every 5° C. for 1 minute, until a temperature of 60° C. was reached. Subsequently, the circulation of water through the jacket was halted, and steam was injected at a pressure of 0.9 bar. Within 3 minutes, the temperature of the cheese mixture had increased to 95° C., at which time the input of steam was stopped.

The viscosity of the cheese upon cooling to 84.8° C. was 7.3 mPa·s. The viscosity of the cheese upon further cooling to 40° C. was 53.5 mPa·s. When cooled to 5° C., the viscosity of the product exceeded 5000 mPa·s.

Example 4

Cheddar cheese (1 kg, matured for 1 to 2 months), at room temperature, was added to a sealed and jacketed vessel equipped with a cutter and bowl scraper. The cutter was set to rotate at 900 rpm, cutting the cheese into small pieces. Water (500 mL, RT) was then added to the finely divided cheese, and the two were mixed thoroughly. The cutter speed was increased to 1500 rpm. The temperature of the water circulating through the jacket of the vessel was increased from 23°

C., at a rate of approximately 3° C. per minute, pausing every 5° C. for 1 minute, until a temperature of 60° C. was reached. Subsequently, the warm circulating water was replaced with water at a temperature of 18° C., lowering the temperature of the cheese mixture to 27° C. The temperature of the water circulating through the jacket of the vessel was subsequently increased at a rate of approximately 3° C. per minute, pausing every 5° C. for 1 minute, until a temperature of 89° C. was reached. During this rise in temperature, an aliquot of water (100 mL) was added to the cheese mixture.

The viscosity of the cheese upon cooling to 77.5° C. was 90.7 mPa·s. The viscosity of the cheese upon further cooling to 40° C. was 2487 mPa·s. When cooled to 5° C., the viscosity of the product exceeded 5000 mPa·s.

Example 5

Colby (1 kg) at room temperature, was added to a covered and jacketed vessel equipped with a cutter and bowl scraper. The cutter was set to rotate at 900 rpm, cutting the cheese into small pieces. Water (400 mL, RT) was then added to the finely divided cheese, and the two were mixed thoroughly. The cutter speed was increased in steps to 1500 rpm. The temperature of the water circulating through the jacket was increased from 23° C., at a rate of approximately 3° C. per minute, pausing every 5° C. for 1 minute until a temperature of 52° C. was reached. The product was then allowed to cool naturally to ambient temperature (for convenience), overnight.

The gelled product was further reduced to a paste by the addition of (100 mL, RT) and under the influence of the cutter rotating at 1500 rpm, the heating regime was repeated with the exception that pauses were not made during the progression to 95° C.

The viscosity of the cheese upon cooling to 71.5° C. was 100 mPa·s. The viscosity of the cheese upon further cooling to 40° C. was 2885 mPa·s.

Example 6

A mature and mild Cheddar blend comprising 500 g of each at a temperature of 16° C. was added to a covered and jacketed vessel equipped with a cutter and bowl scraper. The cutter was set to rotate at 1500 rpm and a partial vacuum drawn to enable 450 g of water to be drawn slowly into the bowl. The mixing and cutting process continued rendering the mixture into a fine paste. The temperature of the water circulating through the jacket was increased from 25° C., at a rate of approximately 2° C. per minute to 50° C. The product was then allowed to cool slowly to 27° C. From 27° C., the cutter and bowl scraper were engaged and the temperature raised by 3° C. per minute to 95° C.

Example 7

Cottage cheese contains approximately 80% moisture. In this example, Cream cheese was heated in the presence of Cottage cheese, which was used as a source of water.

Light creamed Cottage cheese and Cream cheese blended at the ratio of 1:2 (approximately 23.8% fat) were progressively heated from ambient temperature to 95° C. at the rate of 2° C. per minute. The cutter and bowl scraper were used at a moderate setting (50%) to mix and homogenise the product.

The viscosity of the cheese upon cooling to 82° C. was 350 mPa·s. The viscosity of the cheese upon further cooling to 40° C. was 3260 mPa·s.

Example 8

Cottage cheese contains approximately 80% moisture. In this example, Cream cheese was heated in the presence of Cottage cheese, which was used as a source of water.

Light creamed Cottage cheese and Cream cheese blended at the ratio of 4:3 (approximately 16.5% fat) were progressively heated from ambient temperature to 95° C. at the rate of 2° C. per minute. The cutter and bowl scraper were used at a moderate setting (50%) to mix and homogenise the product.

The viscosity of the cheese upon cooling to 87° C. was 314 mPa·s. The viscosity of the cheese upon further cooling to 42.5° C. was 2953 mPa·s.

Example 9

Cottage cheese contains approximately 80% moisture. In this example, Cream cheese was heated in the presence of Cottage cheese, which was used as a source of water.

Light creamed Cottage cheese and Cream cheese blended at the ratio of 4:1 (approximately 9.5% fat) were progressively heated from ambient temperature to 95° C. at the rate of 2° C. per minute. The cutter and bowl scraper were used at a moderate setting (50%) to mix and homogenise the product.

The viscosity of the cheese upon cooling to 86° C. was 168 mPa·s. The viscosity of the cheese upon further cooling to 40° C. was 2668 mPa·s.

Example 10

Cottage cheese contains approximately 80% moisture. In this example, Cottage cheese itself was heated without the addition of another aliquot of water.

Light creamed Cottage cheese having a fat content of approximately 3.4% was progressively heated from ambient temperature to 95° C. at the rate of 2° C. per minute. The cutter and bowl scraper were used at a moderate setting (50%) to mix and homogenise the product.

The viscosity of the cheese upon cooling to 88° C. was 21 mPa·s. The viscosity of the cheese upon further cooling to 43° C. was 285 mPa·s.

The invention claimed is:

1. A method for liquefying a cheese mass comprising raising the temperature of the cheese mass in the presence of water to greater than 82° C. with mixing to provide a liquefied cheese mass in a substantially homogenous state, without the use of additional emulsifying agents, such that any quantity of emulsifying agents present in the liquefied cheese mass is not greater than the quantity of emulsifying agents found naturally in the cheese mass prior to being subjected to said method, and wherein temperature of the cheese mass is raised initially from an initial temperature to a temperature between 50° C. and 60° C. at a rate and with mixing such that the temperature differential between hottest parts and coolest parts of the cheese mass is no more than 5° C., to cause the water to be incorporated into the cheese mass without syneresis.

2. The method according to claim 1 wherein the cheese mass that is liquefied comprises one or more varieties selected from acid and rennet varieties of cheese.

3. The method according to claim 1 or claim 2 wherein the cheese mass that is liquefied comprises one or more varieties selected from the group consisting of Cottage Cheese, Cream Cheese, Colby, Gouda, young Cheddar and mature Cheddar.

4. The method according to claim 1 wherein the cheese mass that is liquefied is Cheddar.

5. The method according to claim 1 wherein the water is present in a ratio of water to cheese mass of between approximately 10:1 and approximately 1:10 by weight.

6. The method according to claim 5 wherein the ratio of water to cheese mass is between approximately 1:1 and 1:5 by weight.

7. The method according to claim 5 wherein the ratio of water to cheese mass is between approximately 1:2 and 1:2.5 by weight.

8. The method according to claim 1 wherein the temperature of cheese mass and water is raised at a rate of less than 5° C. per minute.

9. The method according to claim 1 wherein the temperature of cheese mass and water is raised at a rate of less than 5° C. per minute for less than 5 minutes, followed by a period of less than 5 minutes with substantially no rise in average temperature of the cheese mass and water.

10. The method according to claim 1 wherein the rate of temperature increase of the cheese mass and water from the initial temperature to the temperature between 50° C. and 60° C. is slower than a rate of temperature increase of the cheese mass and water between 60° C. and 82° C.

11. The method according to claim 1 wherein the temperature is raised from 60° C. to 82° C. using a direct injection of steam into the cheese mass and water.

12. The method according to claim 1 wherein the step of raising the temperature of the cheese mass and water to greater than 82° C. further comprises a step wherein the temperature of the cheese mass and water is lowered.

13. The method according to claim 1 further comprising the step of subjecting the cheese mass to a pre-treatment step prior to raising the temperature from the initial temperature to the temperature between 50° C. and 60° C.

14. The method according to claim 13 wherein the pre-treatment step comprises cooling the cheese mass to below −10° C., before allowing the cheese mass to warm to between 10° C. and 25° C.

15. The method according to claim 14 wherein the pre-treatment step comprises cooling the cheese mass to approximately −15° C., before allowing the cheese mass to warm to approximately 18° C.

16. The method according to claim 13 wherein the pre-treatment step comprises storing the cheese mass at a temperature of greater than 15° C. for greater than one week.

17. A method for preparing a cheese mass product that is a spreadable gel comprising the steps of:
  a) raising the temperature of the cheese mass in the presence of water to greater than 82° C. with mixing to provide a liquefied cheese mass in a substantially homogenous state, without the use of additional emulsifying agents, such that any quantity of emulsifying agents present in the liquefied cheese mass is not greater than the quantity of emulsifying agents found naturally in the cheese mass prior to being subjected to said method, and wherein the temperature of the cheese mass is raised initially from an initial temperature to a temperature between 50° C. and 60° C. at a rate and with mixing such that the temperature differential between hottest parts and coolest parts of the cheese mass is no more than 5° C., to cause the water to be incorporated into the cheese mass without syneresis; and
  b) cooling the liquefied cheese mass to less than 30° C.

18. A method for producing a solid cheese mass product comprising the steps of:
  a) raising the temperature of the cheese mass in the presence of water to greater than 82° C. with mixing to provide a liquefied cheese mass in a substantially homogenous state, without the use of additional-emulsifying agents, such that any quantity of emulsifying agents present in the liquefied cheese mass is not greater than the quantity of emulsifying agents found naturally in the cheese mass prior to being subjected to said method, and wherein the temperature of the cheese mass is raised initially from an initial temperature to a temperature between 50° C. and 60° C. at a rate and with mixing such that the temperature differential between hottest parts and coolest parts of the cheese mass is no more than 5° C., to cause the water to be incorporated into the cheese mass without syneresis; and
  b) removing a substantial proportion of water from the liquefied cheese mass.

19. A method according to claim 18 for producing a particulate cheese mass product comprising the steps of:
  a) raising the temperature of the cheese mass in the presence of water to greater than 82° C. with mixing to provide liquefied cheese mass in a substantially homogenous state, without the use of additional emulsifying agents, such that any quantity of emulsifying agents present in the liquefied cheese mass is not greater than the quantity of emulsifying agents found naturally in the cheese mass prior to being subjected to said method, and wherein the temperature of the cheese mass is raised initially from an initial temperature to a temperature between 50° C. and 60° C. at a rate and with mixing such that the temperature differential between hottest parts and coolest parts of the cheese mass is no more than 5° C., to cause the water to be incorporated into the cheese mass without syneresis;
  b) finely dividing the liquefied cheese mass; and
  c) subjecting the finely divided cheese mass to conditions of such temperature, humidity and pressure as to remove a substantial proportion of the water from the cheese mass.

20. A method according to claim 18 for producing a cheese mass biscuit product comprising the steps of:
  a) raising the temperature of the cheese mass in the presence of water to greater than 82° C. with mixing to provide a liquefied cheese mass in a substantially homogenous state, without the use of additional-emulsifying agents, such that any quantity of emulsifying agents present in the liquefied cheese mass is not greater than the quantity of emulsifying agents found naturally in the cheese mass prior to being subjected to said method, and wherein the temperature of the cheese mass is raised initially from an initial temperature to a temperature between 50° C. and 60° C. at a rate and with mixing such that the temperature differential between hottest parts and coolest parts of the cheese mass is no more than 5° C., to cause the water to be incorporated into the cheese mass without syneresis; and
  b) subjecting the liquefied cheese mass to conditions of such temperature, humidity and pressure as to remove a substantial proportion of the water from the cheese mass.

21. A method for liquefying a cheese mass, comprising raising the temperature of the cheese mass in the presence of water with mixing to provide the liquefied cheese mass in a substantially homogenous state and having a viscosity at the raised temperature of less than 1500 mPa·s, without the use of additional emulsifying agents, such that any quantity of emulsifying agents present in the liquefied cheese mass is not greater than the quantity of emulsifying agents found naturally in the cheese mass prior to being subjected to said method, and wherein the temperature of the cheese mass is raised initially from an initial temperature to a temperature between 50° C. and 60° C. at a rate and with mixing such that the temperature differential between hottest parts and coolest parts of the cheese mass is no more than 5° C., to cause the water to be incorporated into the cheese mass without syneresis.

* * * * *